Oct. 16, 1962 J. R. PETRE 3,058,563
MEANS FOR DETECTING AND RESPONDING TO CESSATION OF ROTATION
Filed Feb. 5, 1958 2 Sheets-Sheet 1
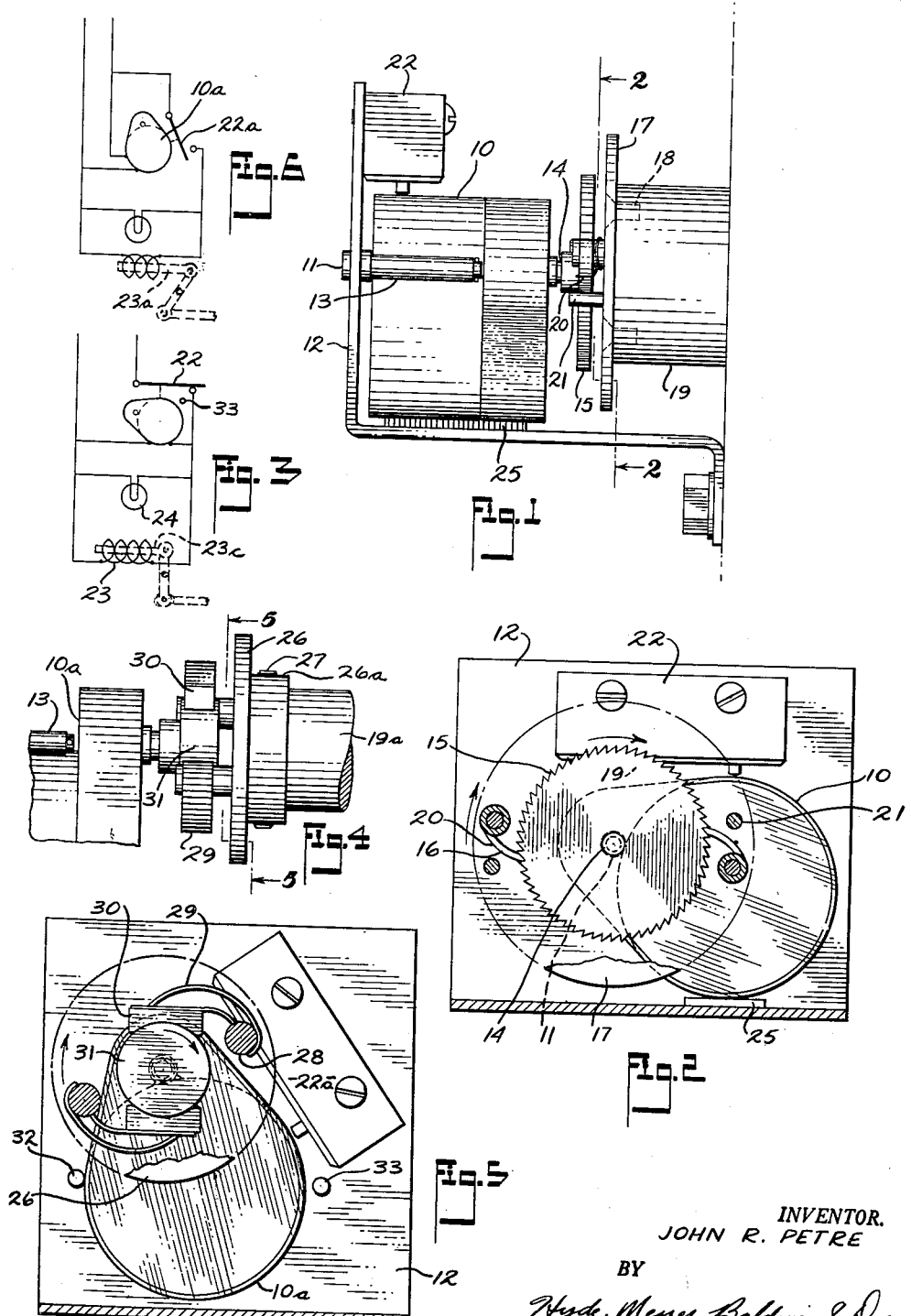
INVENTOR.
JOHN R. PETRE
BY
Hyde, Meyer, Baldwin & Doran
ATTORNEYS

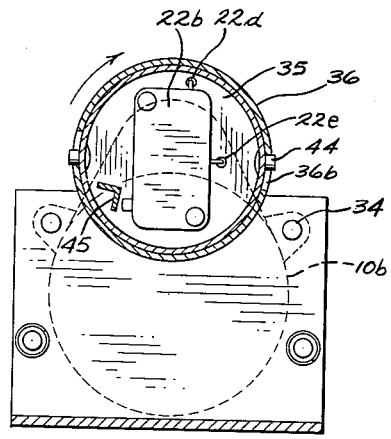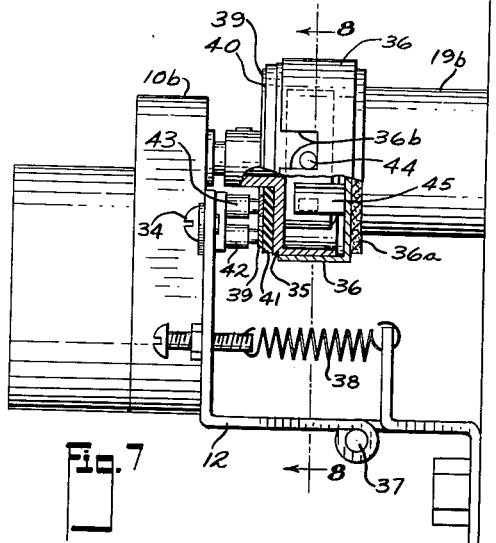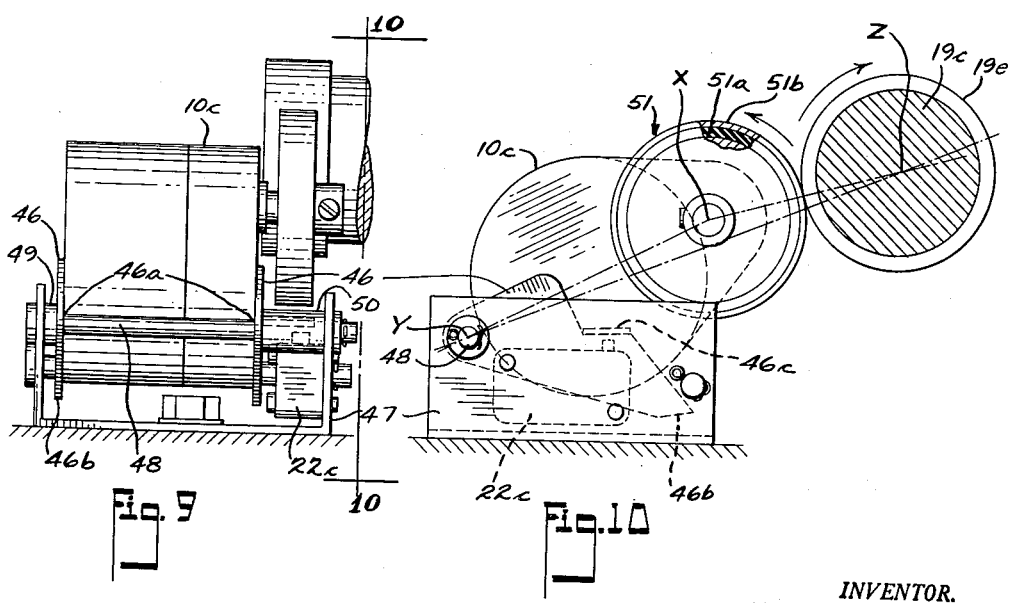

United States Patent Office 3,058,563
Patented Oct. 16, 1962

3,058,563
MEANS FOR DETECTING AND RESPONDING TO CESSATION OF ROTATION
John R. Petre, Cincinnati, Ohio, assignor, by mesne assignments, to McGraw-Edison Company, a corporation of Delaware
Filed Feb. 5, 1958, Ser. No. 713,469
3 Claims. (Cl. 192—116.5)

This invention relates to means for detecting cessation of rotation of a shaft or other rotating elements, and for controlling a further operation responsive thereto. In certain enclosed mechanisms it is sometimes difficult to determine when a rotating element comes to a stop, yet safety considerations may make it desirable that a further operation, such as the opening of a cover, should not be performed until the rotating element stops. In the commercial laundry field, for example, I may mention the operation of an extractor or a washer-extractor where it is desirable that the safety cover be in closed position while the extractor cylinder is still rotating. There are other applications in this and other fields, involving the control of clutching, reversing, etc.

In the control of safety covers, numerous devices have heretofore been used for locking such covers during internal element rotation. Perhaps the best known type utilizes centrifugal force, with balls or other members arranged to move outward during rotation and either constitute or control a latch. A variation has mercury as the shiftable element, acting in the capacity of an electric switch to control locking. Some form of centrifugal switch appears to be the common commercially available device sold for various applications.

Centrifugal types have been used fairly extensively, being the most obvious form of speed-responsive control. It can be seen, however, that while capable of fairly satisfactory functioning if carefully designed and manufactured, they have an inherent tendency to critical variations in operation and sometimes erratic functioning at very low rotational speed. This is due, of course, to the fact that such devices derive their force or operating power from a member being controlled, so that as this member approaches zero speed the corresponding force likewise approaches zero.

There are three other main types of prior-art devices which are adapted for automatic control of a lock or other element. The first utilizes some form of fluid pressure or analogous resilient force, generated by the rotation of the element being controlled. This yielding force is opposed by the weight of the latch parts, the switch spring, or similar element; and again, like the centrifugal, is touchy at very low speed since the operating force drops in proportion to the speed. A fine balance is required to avoid having the control actuate either at too high a speed, or not actuate at all.

The next type operates as a time delay, being set into operation by the turning off of the driving motor, for instance. The delay is preset to operate the switch, latch or such element in that certain length of time which is found to be the usual time required for the machine in question. This system obviously is unsuitable where true control is required, there being no connection between the control device and the rotating part after the time delay begins to operate.

Third, there is the brake spring recoil device used on certain extractors, and disclosed in U.S. Patent Nos. 2,588,634 and 2,261,936 to O. W. Johnson. This is a satisfactory arrangement in machines employing that kind of brake and in which a reversal of movement is permissible or physically possible.

Another system has the same purpose but is not automatic in the sense here considered. This is shown in U.S. Patent No. 1,787,602 to Bryson. Here, there is no locking or no switch operation in response to rotation. Instead, the door unlatching and opening mechanism includes a part which is moved into contact with the rotating element if and when the operator tries to open the door during basket rotation. Cessation of rotation will not, of itself, do anything.

Still another type has somewhat the character of both the centrifugal and the last-named types, although differing from both. This employs some form of rotating abutment or obstruction member, having slots or holes, for instance, in association with a part of the cover raising linkage, so that the operator is prevented from opening the cover until the rotating part has stopped, or at least slowed enough to permit passage of the registering part without damage thereto.

In view of the preceding considerations one object of the present invention has been to provide a "zero speed" device which is positive in action and completely reliable. Another object is to provide such a device which shall be generally applicable to rotatable elements, i.e., not constituting a design characteristic of the machine itself. A further object is to provide a small, compact device of very simple construction and low cost.

These objects are achieved by the use of what may be termed a rate-comparing means, in combination with a source of energy not variable in response to the rotation of the controlled machine. While theoretically these two means can be separate, I have advantageously combined them by simply using a small synchronous motor. These are widely used for various purposes, and are available in several types and in a wide range of speeds. One use, of course, is in electric clocks. The particular make here shown is the Cramer, a medium torque motor available separately and also used in a large variety of timers, etc., made by that concern.

Objects in addition to those above noted will be apparent from a study of the following description of several embodiments of the invention, in conjunction with the accompanying drawings, in which FIG. 1 is a side elevational view of a device embodying my invention.

FIG. 2 is a sectional view taken on the line 2—2 of FIG. 1.

FIG. 3 is a simplified schematic-diagrammatic view showing the electrical operation of the device.

FIG. 4 is a side elevational view of another embodiment of the invention.

FIG. 5 is a sectional view taken on the line 5—5 of FIG. 4.

FIG. 6 is a view similar to FIG. 3 but showing the electrical hookup for the embodiment of FIGS. 4 and 5.

FIG. 7 is a side elevational view of still another embodiment of my invention.

FIG. 8 is a sectional view taken on the line 8—8 of FIG. 7.

FIG. 9 is a side elevational view showing yet another embodiment of the invention.

FIG. 10 is a sectional view taken on the line 10—10 of FIG. 9.

Referring now to the species shown in FIGS. 1, 2 and 3, the motor 10 is a compactly encased motor-gear unit. For the purpose at hand a motor of very low speed, say ½ to 2 r.p.m., can be employed. The motor is here shown pivotally supported by a stud 11 on bracket 12, the stud fitting through a tubular bearing 13 on the motor casing. This bearing is not a part of the motor as supplied, but can be attached by soldering, etc., or for the purpose of this invention might be part of the casing. The pivot is axially aligned with motor shaft 14.

Secured to shaft 14 is a ratchet 15. Co-operating therewith are two pawls 16, although one or several could be used. These are carried by a disc 17, secured as by screws 18 to the end of the shaft 19 or other rotatable member of the associated machine. In all of the embodiments to be described this element is shown as being carried directly by the associated machine shaft. This is desirable for simplicity and accuracy, but it will be evident that this co-operating element could, instead, be separately journalled on the bracket or other support, and driven by a light belt or chain from the shaft. A coil spring 20 urges each pawl into engagement with the ratchet, and stop pins 21 limit outward swing of the pawls. Switch 22 may desirably be of the light-action, snap type, the well-known Micro-switch brand, for example, and either normally-open or normally closed, single or double throw, etc., according to the kind of circuit used. The switch is mounted on bracket 12, and with the control in the condition shown in FIG. 3, the switch is closed in unactuated position.

In all of the embodiments the views show the position of parts when the associated machine is rotating. Referring to FIGURE 2, the ratchet and the pawls both rotate in the same direction, here clockwise as indicated by arrows. The ratchet is moving at the constant rate of, say, ½ r.p.m. The pawls are rotating at some speed greater than this, thus over-running the ratchet. Note at this point that while the controlling function is by a principle that is not dependent on centrifugal force, this latter force can advantageously be utilized as disclosed to save wear and tear on the contacting parts, the pawls and ratchet. They are here shown as being in contact, which is the case when the shaft 19 has slowed to a fairly low rate. The springs 20 are light, selected to allow the pawls to move out of engagement with the ratchet during normal operating speed of the machine.

The machine shaft 19 is decelerating toward a stop, either through normal friction or with braking. Switch 22 is unactuated, and being normally closed, FIGURE 3, will be energizing an energizable member such as solenoid coil 23. Depending upon the particular application this could also be a relay, or such. For instance, it could be a solenoid holding a door or cover locked on an extractor. A signal light 24 could be added as shown. So long as the shaft 19 exceeds ½ r.p.m. the pawls continue to over-run the ratchet, and motor 10 rests on the bracket bumper pad 25. When the shaft speed drops below ½ r.p.m., toward zero the ratchet in effect overtakes the pawls. The latter now act to prevent rotation of the ratchet, and as a consequence, a counterclockwise torque is applied to the motor itself, acting about axes 11—14, and the motor casing actuates switch 22. This de-energizes coil 23, light 24 and also motor 10. Due to the amount of gearing in motors of this type the shaft 14 is effectively locked, so that the motor casing will remain raised, holding the switch operated. When the machine is restarted the motor lowers and switch 22 closes to restore the original condition. If coil 23 has maintained a locking device in locked position, for example by means of the solenoid armature 23c, de-energization of the coil releases the lock.

The control of FIGURES 4, 5, 6 is essentially the same, except that a frictional contact is used in place of the ratchet and pawls. A disc 26 is secured, as by a hub part 26a and set screws 27, to the shaft of the associated machine. Studs 28 in this disc support spring arms 29 which carry friction pads 30. These engage the periphery of a friction wheel 31 secured to the shaft 19a of the motor. The material used for these contacting surfaces would depend on the permissible rate of wear, strength of spring arms 29, etc. The contact may either be maintained at all times, or, preferably, the arms 29 may be of sufficient resilience that pads 30 lift off of wheel 31 when the machine picks up speed. In that case the engaging surface could have a high coefficient of friction.

In FIGURE 5 the machine is rotating and pads 30 are frictionally over-running wheel 31 which is rotating at ½ r.p.m. The motor casing is against stop stud 32. As in the ratchet design described above, when the machine rotation drops below ½ r.p.m. there is a braking of the motor shaft, and the torque acts counterclockwies on the motor, which then operates the switch. With this frictional form the motor 10a may be arranged, if desired, to continue running, its casing holding the switch actuated and pressing against a stop stud 33. FIGURE 6 shows the motor 10a thus directly connected. It also shows the switch 22a as being normally open, so that stopping of the machine lights the signal and energizes the coil 23a of the control means. It will be understood that these simple diagrams are merely suggestive and that the switch 22a may be connected into whatever form of circuitry is used. In some cases a valve or a mechanical trip or link may be used instead of a switch.

In the embodiment shown in FIGURES 7 and 8 the switch itself rotates at the selected low rate. In this embodiment I show a frictional, axial (face to face) engagement of the control element with the machine shaft 19b, although an adaptation of the encircling engagement of the two previous forms could be used. The motor 10b is here solidly mounted on the supporting bracket 12 by screws 34. Secured to the motor shaft is a cup or shell member 35. Fitting smoothly over this is an outer shell 36 having a friction face 36a. This is held in contact with the end face of the machine shaft 19b, desirably with an adjustable yielding pressure. This can be accomplished as shown by having the supporting bracket hinged, as at 37 and yieldingly urged clockwise by springs 38.

A miniature type switch 22b is secured to the wall of cup 35. Its leads 22d, e are connected to a pair of concentric pick-up rings, 39, 40, mounted on insulating piece 41 on the outside wall of shell 35. A pair of co-operating contacting or brushes 42, 43 are mounted on bracket 12. Stop pins 44 on cup 35 co-operate with notches 36b in outer shell 36 to permit limited turning of one shell relative to the other. The parts are shown in the condition assumed during rotation of machine shaft 19b. Motor 10b is turning cup 35, and therewith switch 22b, at ½ r.p.m. in the same direction as the machine shaft. Frictional engagement of the latter with the outer cup at 36a has turned this cup to the position shown, the notches or cutouts 36b in engagement with pins 44. Thus, the cup unit is rotating at ½ r.p.m., and a switch actuator 45, secured to the wall of cup 36, is held away from switch 22b, FIGURE 8. When the machine speed falls below ½ r.p.m. toward a stop, the outer shell 36 is braked accordingly, whereupon switch 22b moves toward actuator abutment 45 and operates its button thereon. Operation of the switch may be arranged to either stop motor 10b or not, as with the first two described embodiments.

It may be noted at this point that the switch could be mounted in cup 36, and abutment 45 in cup 35, with both facing in the other direction, so that during machine rotation the switch would be held away from the actuator. As another alternative, the switch and actuator could be engaged during machine operation and move apart as the machine stops. The latter point applies also, of course, to the first two described embodiments, where the switch could be on the opposite side of the motor, held operated (a spring assisting the weight of the motor) during machine rotation. However, the arrangement shown is the preferred one.

The embodiment shown in FIGS. 9 and 10 has the motor pivotally mounted but the action and purpose is different from the earlier embodiments. The motor 10c here has a pair of plates 46 secured to it to provide a pivot bearing 46a and motion-limiting feet 46b. One plate also includes a switch-actuator finger 46c. These parts could be built into the motor casing. A supporting base member 47 journals the motor in side flanges by means of a pivot pin 48. Parts 49, 50 are spacers, but could also be bearing hubs for either plates 46 or support 47. A switch 22c is mounted on a side flange of the base 47.

Motor 10c rotates a wheel 51 at, say, ½ r.p.m. Here, since the contact with the machine element is peripheral, the directions of rotation must be opposite. However, it will be noted that the actual contacting surfaces move in the same direction. The machine shaft 19c can be fitted with a wear ring 19e if desired. This could be metal, or some friction material, as mentioned hereinafter. The unit is so located on the machine frame that when the wheel 51 is just contacting the shaft or, here, the wear ring 19a, the motor shaft axis X will be a short distance to one side of the line joining pivot axis Y and machine shaft axis Z. The unit is preferably so disposed that wheel 51 will rest lightly by gravity against shaft or ring 19a—although the unit could be vertical, held in contact by a spring.

With wheel 51 turning at ½ r.p.m. as indicated, and the machine rotating in the indicated direction at a higher speed, the wheel 51 rests in light slipping contact against shaft ring 19e, the higher speed of ring 19e tending to move wheel 51 up out of contact. In this position the finger 46c is up and switch 22c unactuated. When the machine rotation drops below ½ r.p.m. in coming to a stop, the rotation of wheel 51 becomes effective to produce a downward rolling. This is permitted by the slightly yieldable construction of the wheel, there being a layer of rubber 51a below the surface band 51b. The same result could be obtained by having pivot 48 slightly displaceable. The wheel rolls down the short distance to where its axis is on or just below the line Y—Z, switch 22c being operated by finger 46c and feet 46b contacting base 47. The motor 10c is preferably de-energized responsive to actuation of the switch. In respect to the frictional characteristics of the wheel and ring (or shaft) surfaces, it can be seen that the relationship or positioning of the various centers or axes is such that a kind of toggle effect is produced. The three axes, Y, X, Z, are not far from being in line beforehand, so the wheel will grip well even at the start of its rolling. Continued movement results in a progressively firmer contact. Thus, the surface materials need not have a very high coefficient of friction and may be selected primarily for good wear resistance. Also, of course, these elements could be readily replaced.

For all of these forms of the device a shield or casing would preferably be provided. As to the speed of motor 10, it will be noticed that while the embodiments shown in FIGS. 1 to 8 have a direct one-to-one relationship between the motor and the machine element, the embodiment of FIGS. 9 and 10 with a peripheral drive, may employ different speed ratios. For example, supposing that in FIGURES 9 and 10 the shaft 19c were of bigger diameter, or that it be a cylinder or drum of some sort, then to give the same results the speed of wheel 51 could be proportionately higher. Say this 1½ inch wheel were being used in peripheral contact with a cylinder of 24" diameter. Again assuming ½ r.p.m., as the threshold rate, note that this rate pertains to the machine and not, in this case, to the motor wheel 51. Here the wheel speed should be 8 r.p.m. Of course, a ½ r.p.m. motor could be used if desired, which would give a threshold rate of ¹⁄₃₂ r.p.m. for the machine. These same considerations would apply to the embodiments of FIGS. 1 to 8 if their respective elements 17, 26, 36 were arranged for peripheral or belt drive, elements 17 and 26 being journalled on the support instead of being carried by the machine shaft—as before mentioned, and the drive to member 36 again having a slip therein.

The extremely low limit rates, such as ¹⁄₃₂ r.p.m. noted above, are superfluous, however. Note that with a limiting speed of, say, ½ r.p.m., the switch-operating means can begin to function only when the machine speed falls below this point. Machines decelerating to a halt will reach a dead stop almost immediately after falling to ½ r.p.m. In a slow coasting deceleration the time from ½ r.p.m. to zero might be about ¹⁄₁₀ second, and in a moderate braking stop this time may be only about ¹⁄₃₀ second. Taking the embodiment of FIGS. 1 to 3 as a specific example—suppose that the machine has just reached ½ r.p.m. It stops completely before the pawls move a measurable distance farther, and the motor thereupon swings upward at the motor rate of ½ r.p.m., or 3° per second. Approximately 3° of motor swing is required to actuate the switch as here positioned, so the switch will thus be operated about one second after dead stop. This shows that a somewhat faster motor could be used in this case. It will be understood that the motor rate, switch positioning, etc., would be selected to cause operation of the control or latch element exactly as desired for a given apparatus. As mentioned in the objects of the invention, the device is by its nature positive and reliable, employing an accurate rate reference combined with an unvarying source of power for switch operation.

What is claimed is:

1. In a mechanism having a rotatable shaft and also having an energizable element which is to be operatively affected upon deceleration of shaft rotation to below a predetermined rate, control means responsive to such deceleration comprising an electric circuit for energizing said energizable element, a switch in said circuit for permitting or preventing power flow in said circuit, a synchronous motor rotating at said predetermined rate, means providing an axis of swing, said motor being mounted for limited swinging movement around said axis, the axis of rotation of said motor being offset from said axis of swing, a pair of cooperating parts carried respectively one by said motor and one by said shaft, means permitting relative motion between said parts while the rate of rotation of said shaft exceeds that of said motor but obstructing said relative motion when the rate of rotation of said shaft is less than that of said element, and means responsive to such obstruction of relative motion to cause immediate reaction swing of said motor around said axis for operating said switch.

2. In a mechanism having a rotatable shaft and also having an element which is disposed to be activated upon deceleration of shaft rotation to below a predetermined low rate, control means effective on said element and responsive to shaft rotation below said predetermined rate comprising an electric circuit, energizable means in said circuit operatively effective on said element, a switch in said circuit for controlling current flow therein, a synchronous geared-down motor unit having an output shaft laterally offset from the motor center, said output shaft rotating at said predetermined low rate, means providing an axis of swing in alignment with the axis of rotation of said output shaft, said motor unit being mounted for limited arcuate swinging movement around said axis of swing, a first cooperating part rotating with said shaft, a second cooperating part rotating with said motor, said parts constituting complementary unidirectional sliding contact portions so disposed as to permit mutual relative sliding movement when said shaft is rotating faster than said motor, but to prevent relative sliding movement when said shaft is rotating slower than said motor, and means responsive to termination of relative sliding movement to cause swing of said motor around said axis of swing and thereby become effective on said switch to cause operation thereof.

3. In a mechanism having a rotatable shaft and also having energizable means which is to be activated only upon deceleration of shaft rotation to below a predetermined low rate, control means effective on said energizable means and responsive to shaft rotation below said predetermined rate comprising an electric circuit, said energizable means being in said circuit, a switch in said circuit for controlling current flow to said energizable means, a synchronous geared-down motor unit having an output shaft laterally offset from the motor center, and means entirely independent of said rotatable shaft for rotating said output shaft at said predetermined low rate, means providing an axis of swing in alignment with the axis of rotation of said motor unit, said motor unit being mounted for limited arcuate swinging movement around said axis of swing, a unidirectional driving couple consisting of a ratchet and pawl, one part of said couple rotating with said shaft and the other part of said couple rotating with said motor, said couple being so oriented that free movement of said ratchet past said pawl is permitted when said shaft is rotating faster than said motor, but said pawl blocks movement of said ratchet when said shaft rotation decelerates to below the rate of rotation of said motor, means causing yielding swing of said motor around said axis of swing when said pawl blocks said ratchet as aforesaid, said yielding swing being effective to operate said switch and operatively affect said energizable means.

References Cited in the file of this patent

UNITED STATES PATENTS

| | | |
|---|---|---|
| 1,732,902 | Lowther | Oct. 22, 1929 |
| 1,797,603 | Bryson | Mar. 24, 1931 |
| 1,991,874 | Williams | Feb. 19, 1935 |
| 1,996,849 | Bauer | Apr. 9, 1935 |
| 2,374,450 | Nelles | Apr. 24, 1945 |
| 2,417,528 | Ten Cate et al. | Mar. 18, 1947 |
| 2,456,618 | Carless | Dec. 21, 1948 |
| 2,481,989 | Eddison | Sept. 13, 1949 |
| 2,489,438 | Schrader | Nov. 29, 1949 |
| 2,495,917 | Miner | Jan. 31, 1950 |
| 2,517,567 | Hill et al. | Aug. 8, 1950 |
| 2,596,928 | Ide | May 13, 1952 |

FOREIGN PATENTS

| | | |
|---|---|---|
| 445,694 | Italy | Feb. 22, 1949 |